United States Patent [19]

Warren, Jr. et al.

[11] Patent Number: 4,650,416
[45] Date of Patent: Mar. 17, 1987

[54] NF3 COMBUSTOR FOR CYLINDRICAL LASER

[75] Inventors: Walter R. Warren, Jr., Rancho Palos Verdes; Norman Cohen, Los Angeles, both of Calif.

[73] Assignee: The United States of America as represented by the Secretary of the Air Force, Washington, D.C.

[21] Appl. No.: 796,125

[22] Filed: Nov. 8, 1985

[51] Int. Cl.$^4$ ............................................. F23R 1/06
[52] U.S. Cl. .................................... 431/121; 431/158; 431/177; 431/190; 372/89
[58] Field of Search ............... 431/121, 158, 174, 177, 431/190, 354; 372/89

[56] References Cited

U.S. PATENT DOCUMENTS

| | | | |
|---|---|---|---|
| 3,251,666 | 5/1966 | Levecque et al. | 431/158 |
| 3,540,853 | 11/1970 | Kulling et al. | 431/190 X |
| 3,701,045 | 10/1972 | Bronfin et al. | 372/89 |
| 4,108,591 | 8/1978 | Egan et al. | 431/121 |
| 4,213,102 | 7/1980 | Warren, Jr. et al. | 372/89 |
| 4,220,933 | 9/1980 | Kuhn, Jr. | 372/89 |
| 4,453,914 | 6/1984 | Huniu et al. | 431/121 |

FOREIGN PATENT DOCUMENTS 7513563  5/1976  Netherlands ........................ 372/89

OTHER PUBLICATIONS

Wendt, *Gas-Flow and Chemical Lasers*, McGraw-Hill, pp. 151-155, 1979.
Durran et al, F-Atom Depletion in NF3 Combustion Laser Flow, Aerospace Corporation, Technical Report SD-TR-83-10, 1983.

*Primary Examiner*—Margaret A. Focarino
*Attorney, Agent, or Firm*—Stanton E. Collier; Donald J. Singer

[57] ABSTRACT

A combustor using $D_2/NF_3/He$ is used in a laser gain generator in a cylindrical gas laser. The combustor includes a plurality of primary rings having fuel, oxidizer and diluent orifices therein. Fuel and oxidizer orifices form a triplet injector set that provides a reactant set. Two diluent orifices form a diluent injector set that provides a diluent set. These sets alternate about each primary ring and from one primary ring to the adjacent primary ring. Because the diluent set does not mix directly with the reactant set initially, a greater percentage of lasing products are formed because of the higher temperature in the reacting zone. Diluent is mixed as required at a later stage in the flow.

4 Claims, 6 Drawing Figures

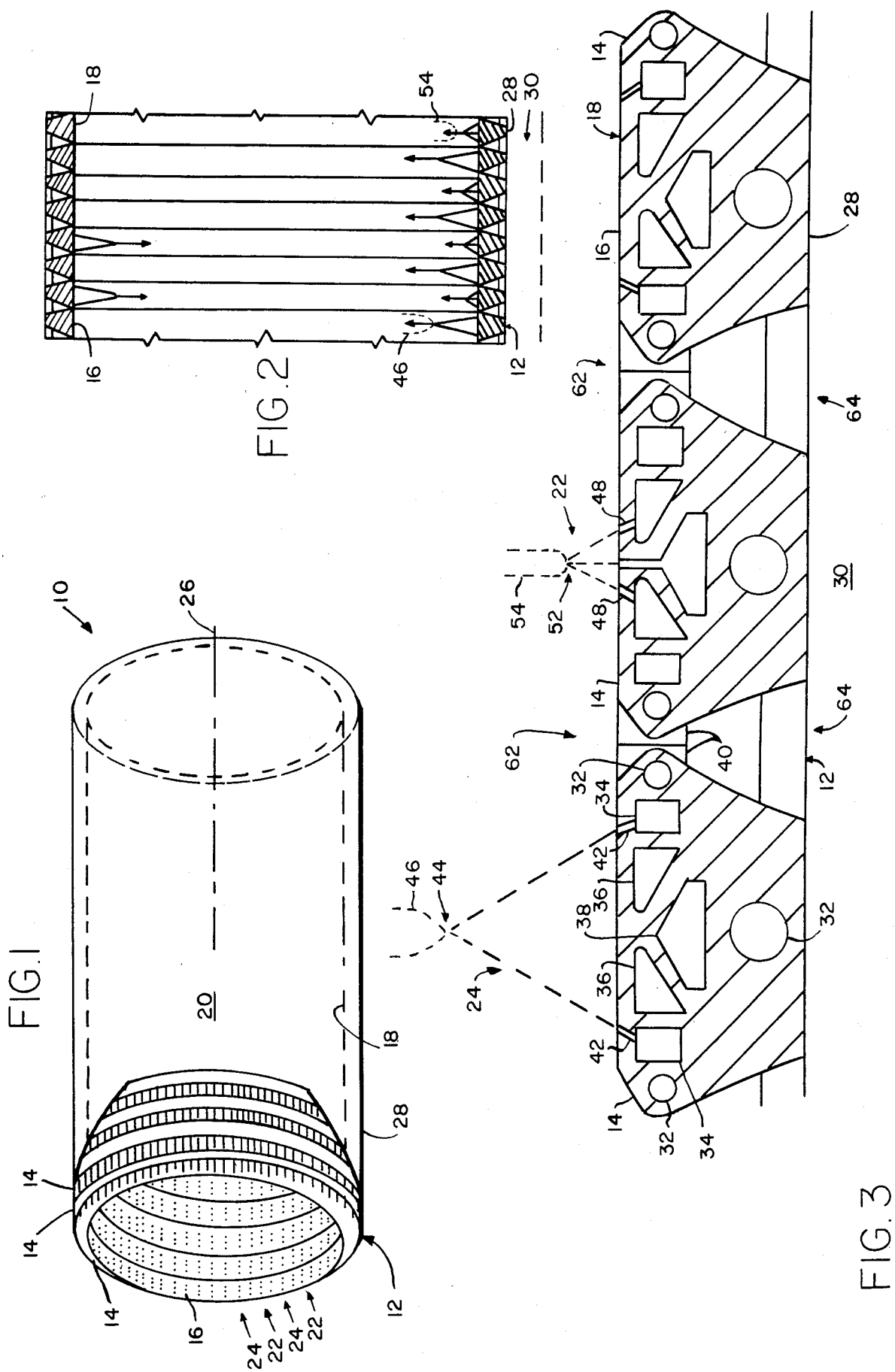

NF₃ COMBUSTOR FOR CYLINDRICAL LASER

STATEMENT OF GOVERNMENT INTEREST

The invention described herein may be manufactured and used by or for the Government for governmental purposes without the payment of any royalty thereon.

BACKGROUND OF THE INVENTION

This invention relates generally to cylindrical lasers, and more particularly, relates to a combustor used in a gain generator assembly used in the cylindrical laser to produce a lasing gas.

One particular prior art gain generator with a combustion chamber therein is shown in U.S Pat. No. 4,453,914, entitled "Low Heat Loss Laser Combustion Chamber", and is incorporated herein.

This prior gain generator has a plurality of primary rings which are combined to form a cylindrical shaped cavity. End caps attached to the primary rings and a laser housing enclose the cylindrial cavity forming a combustion chamber without a centerbody or struts therein as in prior devices. The primary ring combines the primary injectors and primary nozzles and has fluid channels formed therein for carrying fuel and oxidizer premixed with diluent therein to the primary injectors. The fuel and oxidizer with diluent mixed therein are injected by the primary injectors toward the centerline of the combustion chamber where they react forming reaction products. Because of increased pressure and temperature a counter flow of reaction products is set up such that the products flow past the primary nozzles which are a functional part of the primary rings and past the secondary injector array into a lasing cavity where additional compositions are injected by the secondary injector array. Fuel and oxidizer are routed to the gain generator assembly through supply manifolds to the primary ring feed/support struts. Upon entering the primary ring the fuel and oxidizer are used to cool the ring through channels appropriately placed near heated surfaces. Fuel and oxidizer distribution manifolds in the primary rings cause the fuel and oxidizer to be expelled from the primary injectors into the combustion chamber in a controlled manner. A laser cavity fuel feed manifold supplies fuel to the secondary injector array. The gain generator assembly is mounted in a cylindrical cavity of the laser housing.

Because of the inherent dangers in handling large quantities of fluorine, $NF_3$ is used in most chemical lasers as a fluorine-atom generating source. A stream of $NF_3$, premixed with a diluent (usually helium) and a stream of $H_2$ (or other fuel, also premixed with a diluent) are introduced through separate injectors into a combustor chamber where they are mixed. The final precombustion mixture is $NF_3$ rich so that after combustion flourine atoms will be present for use in a downstream chemical laser reaction process $(F+D_2 \rightarrow DF^*+H)$. $NF_3$-$H_2$ combustion is triggered by some suitable initiator—spark, flash, fluorine precursor, or heat source The reaction is sufficiently exothermic to raise the temperature in the combustor considerably—the exact final temperature depending on several factors, including residence time and diluent to fuel ratio. The concentration of F atoms thus generated depends on both kinetic parameters and thermodynamic ones. Thermodynamic constraints in turn depend on temperature and pressure; kinetic constraints depend on both of these and also on residence time and mixing conditions. One of the most decisive factors in determining final F concentration is the plenum temperature. In general, the higher the temperature, the higher the possible F atom concentration. And, in turn, the lower the diluent concentration, the higher the temperature. The useful final diluent concentrations are sufficiently high that the F atoms produced are far fewer than could be generated in a diluent-free system.

SUMMARY OF THE INVENTION

The instant invention sets forth an apparatus for substantially increasing the output of a cylindrical chemical laser using $NF_3$ and thereby overcomes the problems set forth hereinabove.

The present invention sets forth a cylindrical combustion chamber having primary rings which provide a unique field of injectors for inputting oxidizer, fuel, and diluent.

The laser gain generator of the present invention has a plurality of primary rings which are combined to form a cylindrical shaped cavity. End caps attached to the primary rings and a laser housing enclose the cylindrical cavity forming a combustion chamber. The primary ring combines the primary injectors and primary nozzles and has fluid channels formed therein for carrying fuel, oxidizer, and diluent to the primary injectors. The fuel such as deuterium and oxidizers such as $NF_3$ are injected by a triplet set of primary injectors toward the centerline of the combustion chamber. A doublet set of primary injectors input a diluent such as helium. The doublet set and triplet set are alternating about the primary ring and further the adjacent primary rings are shifted one set so that a field is formed having each triplet set surrounded by four doublet sets. Because of increased pressure and temperature a counter flow of reaction products and diluent is set up such that the products and diluent flow past the primary nozzles which are a functional part of the primary rings and past the secondary injector array into a lasing cavity where additional compositions are injected by the secondary injector array. Fuel oxidizer and diluent are routed to the gain generator assembly through supply manifolds to the primary ring feed support struts. Upon entering the primary ring the fuel, oxidizer and diluent are used to cool the ring through channels appropriately placed near heated surfaces. Fuel, oxidizer and diluent distribution manifolds in the primary rings cause the fuel, oxidizer and diluent to be expelled from the primary injectors into the combustion chamber in a controlled manner. A laser cavity fuel feed manifold supplies such as Hz fuel to the secondary injector array. The gain generator assembly is mounted in a cylindrical cavity of the laser housing.

Therefore, it is one object of the present invention to provide a combustor for a cylindrical laser that substantially increases the laser output.

Another object of the present invention is a combustor that allows the reactants to act in an essentially diluent-free combustion zone.

Another object of the present invention is a combustor that allows the diluent to be added after the combustion zone so that pressure, temperature, and chemical ratios can be adjusted to maximize laser output.

These and many other objects and advantages of the present invention will be readily apparent to one skilled in the pertinent art from the following detailed descrip-

BRIEF DESCRIPTION OF THE DRAWINGS

FIG. 1 is a partial view of a cylindrical combustor;
FIG. 2 is a partial cross section of the combustor chamber of FIG. 1;
FIG. 3 is a partial cross section of the primary injector rings of the present invention.

DETAILED DESCRIPTION OF THE PREFERRED EMBODIMENT

Figure 4:
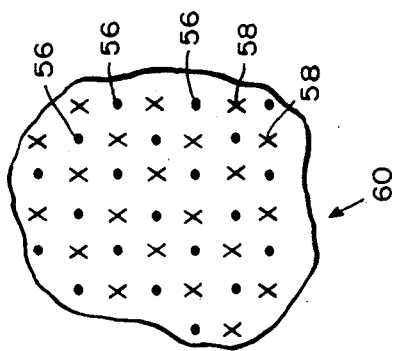
FIG. 4 is a view of the injector field produced by the primary injector rings of the present invention.

In a prior combustor using $D_2/NF_3/He$ (with all of the He diluent premixed with either of both reactants) and with the reactant inlet streams well mixed, there is no strong temperature (T) overshoot at any point in the process. The molecular fragments of $NF_3$- $NF_2$, and $N_2F_2$ (a weakly bound form of 2 NF molecules)—will be formed as a result of the heating of the excess $NF_3$ by the very fast $D_2/NF_3$ combustion process. Below a certain T level—in the 1600° K. to 1800° K. range—these fragments are fairly stable; that is, at lower T levels, the $NF_2$ and $N_2F_2$ fragments produced by the combustion reaction will essentially be the final equilibrium products of combustion, while in the higher T range they will continue to react toward the full dissociation limit with a corresponding drop in T. Even in this latter case, the approach to equilibrium will be slow enough at lower T levels to exceed the combustor residence time, so that the full equilibrium F atom level will not be reached before the frozen primary nozzle expansion process quenches further F atom production. Thus, there is a final equilibrium T level—about 1800° K.—below which the conventional calculation will predict high F atom concentrations, but where, in fact, the F atom concentration will be lower because of the presence of finite amounts of the original $NF_3$ and its dissociation fragments—essentially $NF_2$ and $N_2F_2$. If there are appreciable concentration levels of $N_2F_2$ and $NF_2$ in the primary nozzle expansion flow, they will further deplete the F concentration level in the lasing medium through 2-body recombination to $NF_2$ and $NF_3$.

In a $D_2/NF_3$ chemical laser combustor the equilibrium temperature, $T_c$, of the combustion products should be about 1800° to provide the maximum concentration of F atoms for delivering to the lasing zone; below this $T_c$ level, F is depleted by incomplete dissociation of the excess $NF_3$ originally in the reactants, and above 1800°, although all of the original $NF_3$ releases its F atom, a larger function of the original $NF_3$ must be reacted with $D_2$ to achieve the higher $T_c$. In a prior device, a relatively large concentration of a diluent, He, is added to the combustion gases with either or both of the reactants. Since it is premixed with the excess $NF_3$, the He must also be heated to about 1800° K. Thus, a larger fraction of the original $NF_3$ must be combusted (by adding additional $D_2$) to reach required $T_c$ value than would be necessary if less, or no He was present in the reaction zone.

To avoid the above problems a two-step combustion process in which the $NF_3$ and $D_2$ are first mixed and reacted without diluent and then their combustion products are mixed with the diluent downstream of the reaction zone, but still within the combustion chamber. Thus, it is not necessary to use chemical energy released in the $NF_3/D_2$ reaction to heat the relatively large concentration of He diluent to the dissociation temperature of the excess $NF_3$. Thus, in the reaction zone, the temperature level needed to fully dissociate the excess $NF_3$ to $N_2$ molecules and F atoms is reached with the expenditure of a smaller fraction of the total available $NF_3$ than in a conventional system. Therefore, a larger fraction of the total system energy is made available to the subsequent lasing process with the two-step combustion process.

Using equation (1) for the overall reaction process and assuming that the gases act like ideal gases and there is energy to heat the products, "a" is then given by equation (4)

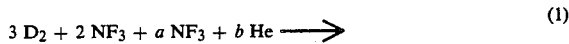

$$3 D_2 + 2 NF_3 + a NF_3 + b He \longrightarrow \qquad (1)$$

| —COMBUSTION— | —F ATOM— | —DILUENT— |
| REACTANTS | SOURCE | |
| +324 Kcal | −a88.1 Kc | |
| HT. OF REAC. | BOND EN. | |

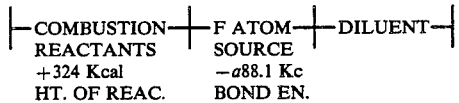

$$6 DF + N_2 + \frac{a}{2} N_2 + 3a F + b He$$

| —COMBUSTION— | —DISSOCIATED— | —DILUENT— |
| PRODUCTS | $a NF_3$ | |
| | PRODUCTS | |

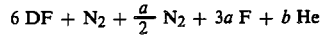

$$Q = (324 - a88.1) Kcal = \sum_P \frac{\gamma}{\gamma - 1} \frac{R}{MW} \cdot N. MW. \Delta T \qquad (2)$$

$$\frac{(324 - a88.1)10^3}{R\Delta T} = 3.5 \left(7 + \frac{a}{2}\right) + 2.5(3a + b) \qquad (3)$$

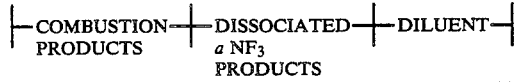

$$a = \frac{324,000/(R\Delta T) - 24.5 - 2.5b}{88,100/(R\Delta T) + 9.25} \qquad (4)$$

Using $\gamma$ (diatoms)=7/5, $\gamma$ (atoms)=5/3, $\Delta T = 1700°$ K. (e.g.: $T_c = 2000°$ K. and $T_o = 3000°$ K.), and R=1986 cal (gm-°K), the results are shown in Table 2 using the equations as defined in Table 1.

TABLE 1

TOTAL COMB. DILUENT RATIO (TO 2F):
$$\psi = \frac{6 + 1 + a/2 + b}{3a/2}$$

$NF_3$ FRACTION USED FOR LASING:
$$\frac{(NF_3)}{(NF_3)} \frac{LASING}{TOTAL} = \frac{a}{a + 2}$$

COMB. DEACTIVATOR RATIO (TO F):
$$\phi = \frac{6 + 1 + a/2}{3a}$$

TABLE 2

| b* | ψ | a | (NF₃)L/(NF₃)T | φ |
|---|---|---|---|---|
| 0* | 2.628 | 2.034 | .504 | 1.314 |
| 10 | 8.904 | 1.322 | .398 | 1.931 |
| 12.68 | 12.00 | 1.125 | .360 | 2.241 |
| 20 | 29.80 | .619 | .234 | 3.986 |
| 28.59 | ∞ | 0 | 0 | ∞ |

*b = 0 IS 1st STEP OF TWO-STEP PROCESS

Figure 5:
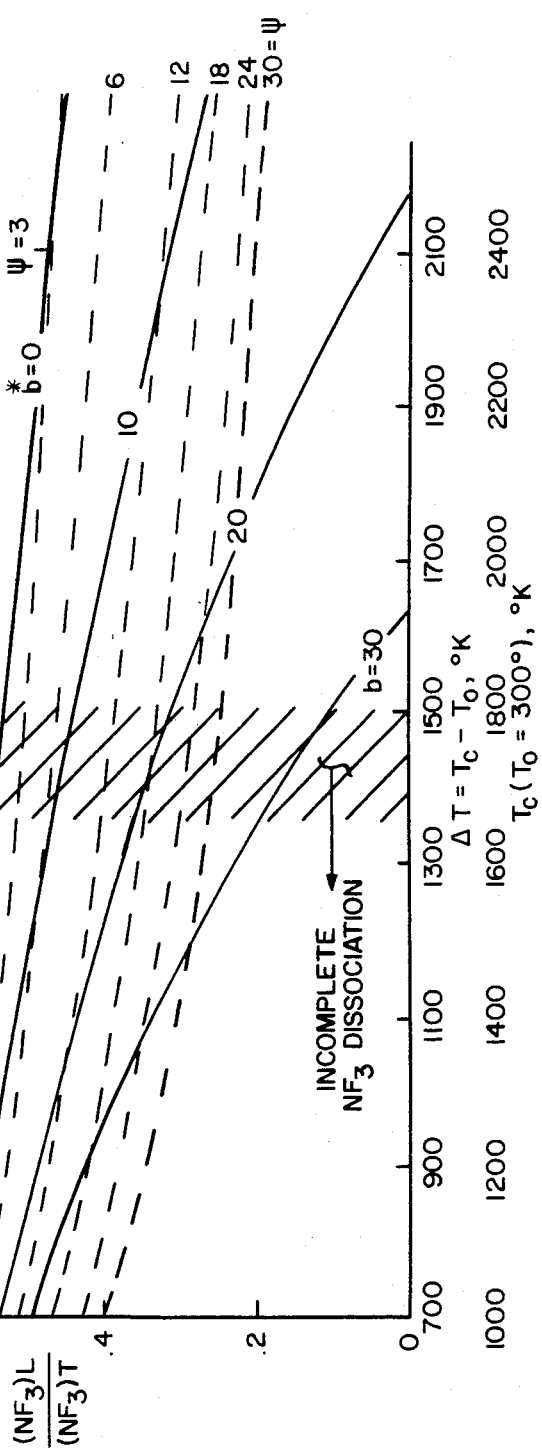
FIG. 5 is a graph of the $D_2/NF_3$ combustion process.

In the analysis, the non-reacting $NF_3$ is assumed to be completely dissociated into $N_2$ and F at the final combustion temperature, $T_c$. The value a/(a+2) is the fraction of the total system $NF_3$ that provides free fluorine to the subsequent process (nozzle expansion, lasing process, exhaust flow). For the sample calculation above done at T=1700° K. it is seen that the first step in the two-step process frees 0.50 of the available fluorine while for nominal space laser device with a $\Psi$ of about 12, only 0.36 of the total fluorine is made available; this indicates an approximate 40% advantage for the two-step system in the utilization of its available $NF_3$ to produce F atoms for the lasing process. Results of the analysis are shown in FIG. 5 over a wide range of potential laser combustor diluent levels and $\Delta T$ values. A partial-two-step process in which some of the He diluent is mixed with the primary reactants in the first step and some is added downstream of the reaction zone might be of value, for example, if the final combustion gas temperature is to be higher than it would be with the full two-step process. Of course, the results shown in FIG. 2 are not valid at $T_c$ values below which the excess $NF_3$ is not fully dissociated.

The potential advantage of the two-step combustion process of using less of the total system chemical energy in the combustion process and, therefore, of delivering more energy to the laser process is shown by the above. The two-step process also has significant advantages over prior systems in the nozzle expansion and laser process areas. One of these is the reduction in the concentration of lasing process deactivators (DF and $N_2$), which is a logical result of the basic characteristic of the two-step system: that is, reduction of the combustion reactants. The deactivant to F atom concentration ratio is shown in Tables 1 and 2 for that illustrative calculation; its reduction from 2.24 for the 12 single-step case to 1.31 for the two-step case is an improvement of 41%, which should translate into an improvement in the lasing process efficiency (order of 10%).

A second favorable characteristic of the two-step process is the fact that the final combustion gas T can be reduced without changing the concentration of free fluorine in the mixture. Once the excess $NF_3$ has been dissociated in the first step into $N_2$ and F it will remain as those species when the temperature is subsequently lowered—as happens when the cool diluent He is added (below T=1500° K., $F_2$ will begin to form); that is, what started as $NF_3$ before it was dissociated will not return as the non-laser producing species NF, $NF_2$, and $NF_3$ when it is cooled, but as lasing producing species F and $F_2$ (since the $N_2$ formed in the first step acts as an inert gas in the second step). Table 3 and FIG. 6 should be referred to in support thereof.

In the one-step process enough $D_2$ is added to the total $NF_3$/He mixture to bring it to an optimum $T_c$ that has been determined empirically. This value of $T_c$ must be high enough to insure that the excess $NF_3$ is completely dissociated. In the one-step process, once $T_c$ has been reached, there is no practical mechanism to change it. On the other hand, for the two-step system, the final mixed temperature $T_2$ can be controlled (with practical limitations) by varying the $T_o$ and/or the concentration level of the He diluent. Thus, the two-step system provides a completely new control parameter on the lasing process—that is, a variable $T_2$ at the maximum and constant free fluorine concentration level. Since we are essentially forced to operate at one combination of these parameters with one-step combustion, it is probable that this is not an optimum point compared to the case where a variable T is allowed. Therefore, this added parameter should produce an optimization to the lasing efficiency above that of the present system of about 35% of its theoretical maximum laser efficiency.

Because the two-step process allows variable T and constant fluorine concentration operation, the two-step process allows us to explore lower T levels at which a fraction of F atoms will be recombined as $F_2$ molecules. This is shown in Table 3.

TABLE 3
COMPARISON OF ONE- AND TWO-STEP COMBUSTION PROCESSES
$T_c = 2000°$ K., $T_o = 300°$ K., $\psi = 9$ $$\psi = \frac{(DF) + (N_2) + (He)}{(F)/2 + (F_2)}$$

ONE-STEP PROCESS $.905 \, D_2 + 1.000 \, NF_3 + 3.046 \, He \longrightarrow$ $1.810 \, DF + .500 \, N_2 + 1.190 \, F + 3.046 \, He: \underline{T_c = 2000° \, K.}$

TWO-STEP PROCESS (1) $.744 \, D_2 + 1.000 \, NF_3 \longrightarrow$ $1.487 \, DF + .500 \, N_2 + 1.513 \, F: \underline{T_c = 2000° \, K.}$ (2) [1st STEP PRODUCTS] + 4.819 He $\longrightarrow$
    AT $T_c$            AT $T_o$ $1.487 \, DF + .500 \, N_2 + .968 \, F + 4.819 \, He: \underline{T_2 = 1240° \, K.}$
$+ .272 \, F_2$ TWO-STEP PROCESS HAS:
- EQUAL $NF_3$
- LESS $D_2$: 18%
- MORE He: 58%
- LESS DF: 18%
- Equal $N_2$
- MORE FLUORINE: 27%
- MORE CHEM. ENERGY IN LASER PROCESS: 73%

Figure 6:
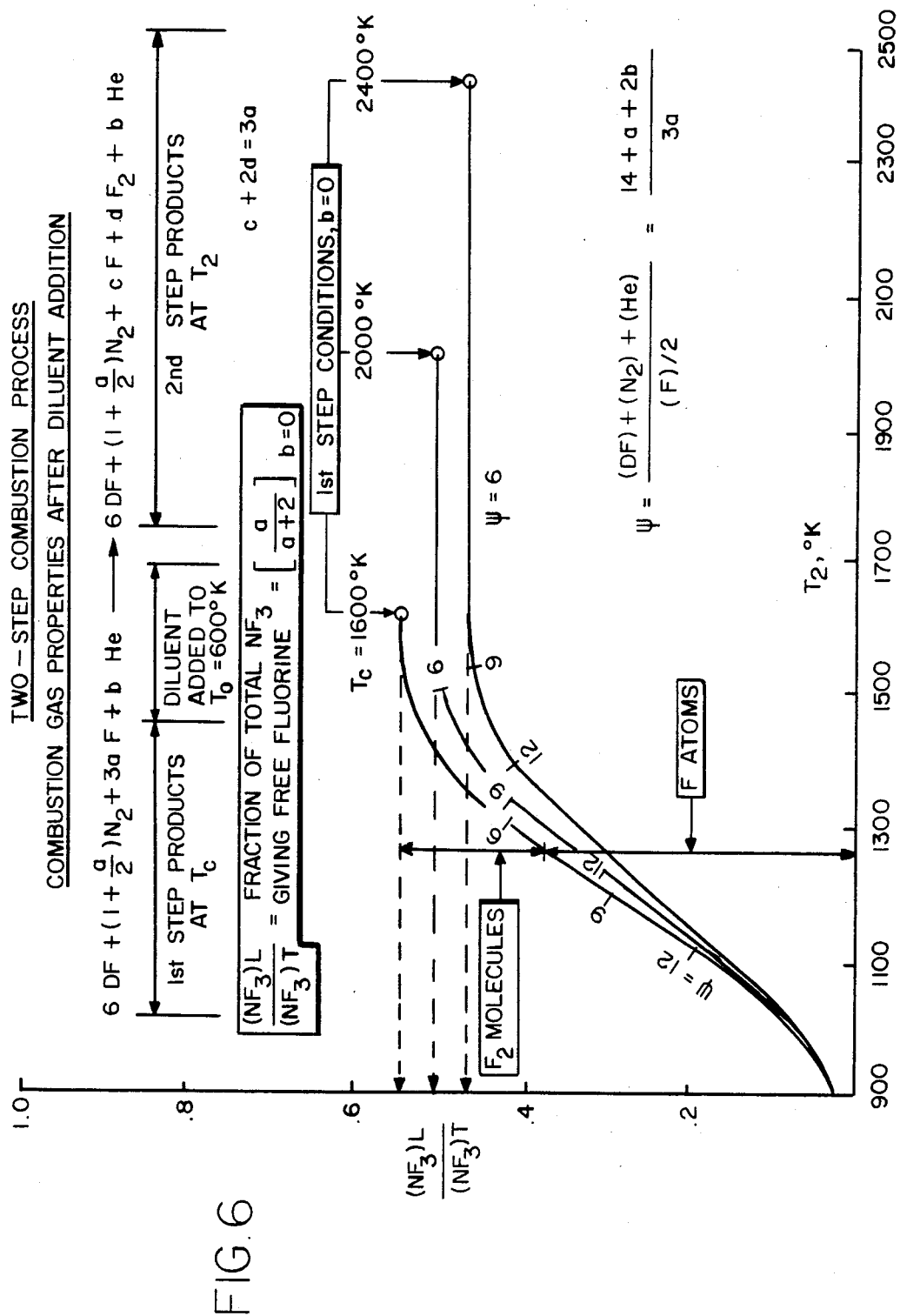
FIG. 6 is a graph of the two-step combustion process.

For a specific comparison of the two-step and one-step processes in which the $T_c$, $T_o$, and final diluent ratio values are held constant, and in FIG. 6 for the range of $T_c$ and diluent ratio values of probable interest. If the full two step approach results in a concentration of $F_2$ in the combustion gas products larger than that consistent with good lasing efficiency, the final $T_2$ can be adjusted either by reacting more of the initial $NF_3$ to give a larger $T_c$ value or by using the partial two step approach in which some of the He is premixed with the combustion reactants.

Finally, with respect to the additional general advantages of the two-step combustion system, the lower combustion gas T should cause longer mode widths in the lasing medium by reducing the controlled reaction rates (which should over-ride the tendency to shorten mode widths caused by a reduction in flow velocities). It is expected that partial operation on the chain reaction will also increase the mode width to some degree.

Several significant improvements in system performance characteristics of the two-step combustion process compared to those of a system using a conventional combustion process are as follows: (1) increased fraction of total $NF_3$ providing F atoms for the lasing process (approximately 40%), (2) decreased concentrations of combustion generated deactivators F atom (41%), (3) optimization of lasing zone T level independent of laser fluorine concentration, (4) increase of lasing zone mode width (lower T,—less deactivators, partial lasing on the chain reaction mechanism), and (5) possible increase of chemical energy released in the lasing zone per mass flow rate of fluorine through partial use of the chain reaction.

The prior combustor referenced above uses a counterflow concept which has premixed reactants and diluent therein. These are injected into the combustor through a large number of impinging triplet injectors located on the inner surface of the large cylindrical combustor volume which also contains the primary nozzle throat slits (approximately 8 cm apart) through which the combustion products mixture exhaust to the annular lasing zone. The term counterflow results from the fact that the initial triplet flows are directed radically inward towards the centerline of the cylindrical combustor volume and turn during and after the combustion process to exit radially outward from the nozzle slits. In this device there has been some evidence of ignition and detonation difficulties using an intermittently-located flame-front ignitor system.

The two-step process reduces the risks of ignition irregularities and detonation as in the prior device. In the two-step process, each hole injects only one gas component—$D_2$, $NF_3$ (and $F_2$ if the $F_2$ lead-gas system is used), or He. Then, the $D_2$ and $NF_3$ streams are canted so they interact first, and the He stream (with increased momentum) is pointed so that it first penetrates to the inner volume of the combustor before it turns and mixes with the products of the $D_2/NF_3$ reaction prior to the exhaustion of the complete mixture through the primary nozzles. This flow configuration approximates the concept of the two-step combustion process; it has several advantages: (1) Before the laser is started, He is injected for a period of time sufficient for it to essentially fill the combustor volume; thus, it cannot contain a detonable mixture when ignition occurs. (2) The impingement of $D_2$ and $NF_3$ ($F_2$) will cause the richest possible mixture of reactants to exist locally which will promote both the start of ignition, and, because of the high local T generated in the absence of diluent, the continuity of ignition in the newly injected reactants. (3) The continued injection of He first into the main volume of the device will prevent accumulation there of a detonable mixture (which would tend to occur if some $D_2$ and $NF_3$ injection ports became clogged). (4) The high local combustion temperatures of the $D_2/NF_3$ mixtures would assure complete dissociation of the excess $NF_3$ into F and $N_2$.

As to a particular embodiment, reference is made to FIG. 1 wherein a cylindrical combustor 10 is shown. Combustor 10 is used in a laser gain generator such as shown in U.S. Pat. No. 4,453,914. Items not shown are an ignition system, end caps, reactants/diluent passages in secondary injector array 12, external support struts for combustor 10, and the means for supplying reactants and diluent to combustor 10. As seen in FIG. 1, combustor 10 has basically a plurality of primary rings 14 connected together. An inside surface 16 of each primary ring 14 forms an inner surface 18 of combustion chamber 20. Along each inside surface 16 of each primary ring 14 are alternating sets of triplet injector sets 22 and doublet injector sets 24. Triplet injector set 22 has three orifices in a line and parallel with combustor axis 26. Doublet injector set 24 has two orifices which are in a line and also parallel to combustor axis 26. As is also seen in FIG. 1, not only do sets 22 and 24 alternate about inside surface 16 of each primary ring 14 but sets 22 and 24 alternate along a line parallel to combustor axis 26 moving from one primary ring 14 to the next primary ring 14. This arrangement of sets 22 and 24 is preferable and is further detailed in FIGS. 2, 3 and 4.

Referring to FIG. 2, a lasing zone 30 is shown about an outer surface 28 of combustor 10. And in greater detail, FIG. 3 shows a cross section through several primary rings 14. In each primary ring 14 are coolant channels 32, diluent channels 34, oxidizer channels 36, and fuel channel 38. In this embodiment, the coolant is $H_2O$, the diluent is He, the oxidizer is $NF_3$ and the fuel is $D_2$. Secondary injector array 12 provides a mixture of $H_2$ and He to the reaction products and diluent coming from combustor 10. The flow channels for $H_2$ and He in secondary injector array 12 are not shown. Each primary ring 14 is connected to an adjacent ring 14 by interface pads 40 which may have therein, not shown, channels for providing coolant, fuels, oxidizer, and/or diluent. Struts, not shown, that hold combustor 10 to a housing, not shown, are also constructed with channels therein for providing the main distribution channels.

Referring to the first primary ring 14 on the left in FIG. 3, doublet injector set 24 is shown having two diluent orifices 42 to diluent channels 34. Diluent orifices 42 are so constructed that the stream of diluent ejected from each meets at a mixing zone 44 to form a jet 46 of diluent.

Referring to the center primary ring 14 shown in FIG. 3, triplet injector set 22 is shown having two oxidizer orifices 48 and one fuel orifice 50 connected to oxidizer channels 36 and fuel channel 38, respectively. Orifices 48 and 50 are aimed so that reactants meet at a reacting zone 52 and form a jet 54 of reactant products. Mixing zone 44 and reacting zone 52 are such that jet 44 forms well beyond the formation point of jet 54 toward axis 26 of combustor 10. A percentage of diluent may be mixed with the oxidizer and fuel in channels 36 and 38 as previously noted. This percentage can be changed to effect changes in temperature, pressure, etc. of the reactant products.

A partial view of inner surface 18 is shown in FIG. 4. Each dot 56 represents the formation point of diluent jet 44. Each "X" 58 represents the formation point of reactant jet 54. As seen, each dot 56 has four x's 56 forming a square thereabout. The combination of dots 56 and x's 58 represent a field 60. Other patterns are clearly possible. Field 60 is cylindrically shaped.

Because of the counter flow set up, the reactant products and diluent reverse direction and flow through throats 62 formed by primary rings 14. Each throat 62 forms a part of a supersonic nozzle 64. As the reactant products and diluent flow past secondary injector array 12 a fuel such as $H_2$ and a diluent such as He are added thereto and causes lasing action in lasing zone 30, FIG. 2.

Clearly, many modifications and variations of the present invention are possible in light of the above teachings and it is therefore understood, that within the inventive scope of the inventive concept, the invention may be practiced otherwise than specifically claimed.

What is claimed is:

1. A ring assembly for use in a combustion of a cylindrical gas laser, said assembly comprising:
   a plurality of primary rings connected to form said ring assembly, each of said primary rings having alternating about an inside surface reactant injector sets and diluent injector sets, each of said reactant injector sets inputting an oxidizer and a fuel into a reacting zone to form a reactant jet of said products within a combustion chamber within said combustor, each of said diluent injector sets inputting a diluent into a mixing zoning to form a jet of diluent within said combustion chamber, said mixing zone being substantially closer to a centerline of said combustion chamber than said reacting zone.

2. A ring assembly as defined in claim 1 wherein said reactant injector set includes two oxidizer orifices and one fuel orifice to form a triplet injector set, streams from said orifices meeting together at said reacting zone to form said reactant jet.

3. A ring assembly as defined in claim 1 wherein said diluent injector set includes two diluent orifices forming a doublet injector set, streams from said diluent orifice meeting together at a mixing zone to form said diluent jet.

4. A ring assembly defined in claim 1 wherein adjacent primary rings have alternating reactant injector sets and diluent injector sets thereon, each injector set having closest thereto four injector sets of the opposite type, said set formed therefrom forming a field having a square grid pattern of said jets.

* * * * *